United States Patent [19]
Kowalski et al.

[11] 4,122,450
[45] Oct. 24, 1978

[54] INFINITE RATIO CLUTTER DETECTING SYSTEM

[75] Inventors: Francis W. Kowalski, Fullerton; Richard D. Wilmot, Buena Park, both of Calif.

[73] Assignee: Hughes Aircraft Company, Culver City, Calif.

[21] Appl. No.: 587,176

[22] Filed: Jun. 16, 1975

[51] Int. Cl.² .................................................. G01S 7/30
[52] U.S. Cl. ............................ 343/17.1 R; 343/5 DP
[58] Field of Search ................. 343/7.7, 17.1 R, 5 DP

[56] References Cited

U.S. PATENT DOCUMENTS

| | | | |
|---|---|---|---|
| 3,325,806 | 6/1967 | Wilmot et al. | 343/5 R |
| 3,720,942 | 3/1973 | Wilmot et al. | 343/7.7 |
| 3,727,215 | 4/1973 | Wilmot | 343/17.1 R |

*Primary Examiner*—Nelson Moskowitz
*Assistant Examiner*—Richard E. Berger
*Attorney, Agent, or Firm*—W. J. Adam; W. H. Mac Allister

[57] ABSTRACT

An automatic clutter detecting and mapping system in which the area being mapped is broken up into clutter mapping quantum areas with corresponding storage cells including reject codes for automatically rejecting clutter returns which may occur in intermittent or fading clutter occurring a small percentage of the time for example. For each clutter mapping cell a clutter count and a reject code are stored in a main memory and in a first mode which is searching for clutter the clutter count is incremented by eight in response to an input targert but is not decremented in the absence of a received target from that clutter mapping area. In any clutter mapping cell when the clutter count reaches a threshold within a selected number of scan periods, the reject code is set to the amplitude corresponding to the maximum amplitude target report received in that cell and provided by a temporary memory. At this time, the clutter count is set to the midrange of its threshold value and the operation goes into a second mode which is searching for changes in the amplitude of the clutter. In the second mode of operation the counter bits for each mapping cell are incremented and decremented by selected values as a function of the target amplitude, with the reject code being set to a new target amplitude value of the report when a threshold is reached and the counter is again set to mid range. If the counter value reaches zero and the clutter has faded, the reject bits are set to zero and the operation is returned to the first mode.

13 Claims, 22 Drawing Figures

INFINITE RATIO CLUTTER DETECTING SYSTEM

BACKGROUND OF THE INVENTION

1. Field of the Invention

This invention relates to a digital video mapping device for use in radar data processing systems and particularly to an infinite ratio clutter detector and mapper that automatically rejects fading or intermittent clutter.

2. Description of the Prior Art

In a radar system which automatically processes video from a surveillance radar, and distinguishes between valid and invalid targets, the automatic data processing system attempts to identify valid targets and when a specified percentage of hits are found a target indication is reported. One of the principal problems involved in determining the validity of the targets results from the presence of clutter which may come from ground structures, bodies of water or from weather conditions. An example of an automatic clutter mapper system is shown in U.S. Pat. No. 3,325,806 which rejected stationary clutter by counting target detections in each clutter mapper cell. This technique satisfactorily allowed the rejection of stationary clutter returns and in the presence of stationary clutter provided a substantially constant clutter false alarm rate. The rejection of stationary clutter returns which were scintillating so that they were not detected every scan is provided by the system in the U.S. Pat. No. 3,720,942 which utilizes a weighted up-down counter to keep a record of detections in each cell. The system of this patent includes a counter with a weighting value of four for detection and a one for a miss so the clutter returns that occurred in a cell more than about 25% of the time were rejected. In these previous techniques, clutter that occurred in an area clutter mapping cell less than 10% of the time such as intermittent clutter or fading clutter is not satisfactorily detected and the clutter false alarm rate conditions are not satisfied under this atmospheric condition. It is found that a clutter condition whereby a number of inversion layers are present in the atmosphere causes the radar beam to bend by refraction to reflect the clutter over the horizon with the refraction varying so that clutter occurs only a small percentage of the time or in an intermittent fashion. It would be a substantial advantage of the art if a clutter mapping system were provided that would satisfactorily detect the presence of not only stationary clutter but intermittent or fading clutter that occurs a small percentage of the time in any quantum reception area, so that the presence of invalid targets resulting from clutter could be reliably determined.

SUMMARY OF THE INVENTION

In the clutter mapping system in accordance with the invention the surveillance area is divided into a number of quantum areas or area mapping cells and determinations are made for each mapping cell as to the occurrence of clutter in that area in space. In a first mode of operation which is searching for clutter in each mapping cell, the system utilizes a counter which is incremented by a selected value such as eight in response to the detection of a target and is not decremented in response to the absence of a target so that the ratio of increments to decrements is eight divided by zero which is infinity. Because the counter will accumulate detections and continually increase its count, the counter is reset periodically with substantially no effect on the clutter detection capability. A clutter count threshold is selected to allow valid moving targets to fly across a mapping cell area in less than that number of scans so that valid moving targets will not produce erroneous clutter indications. The clutter count which is stored in main memory as a count code is interrogated for each cell during each scan and when these count bits reach a threshold, a reject code of a maximum target amplitude for that cell, is set into the corresponding memory position. Upon the storing of the reject code bits in any cell, the clutter count is set to mid range at one-half of the threshold value, for example to provide searching for changes in the clutter amplitude in that mapping cell. If the threshold has not been reached by the clutter count at the end of a selected scan period the clutter count or code is reset to zero. In the second mode of operation, the clutter count is incremented by a selected value such as four for detections that have a target amplitude greater than the stored reject code and are decremented by a value such as one for detections with a target amplitude less than the stored reject code. Also in the second mode when the clutter reaches the selected threshold the reject code is set to a new value equal to the amplitude of the target report and the clutter count in that mapping cell is again set to mid range. If the clutter count during the second mode reaches zero and no clutter is present, the reject bits are set to zero and the mode of operation is returned to the searching for clutter of the first mode. The system in accordance with the invention has been found to reliably detect the presence of clutter in any clutter mapping cell area that occurs a small percentage of the time so as to reliably detect clutter that fades or is constantly varying in amplitude, resulting in the rejection of the clutter with valid targets being detected.

It is therefore an object of this invention to provide a clutter detection system that reliably detects the presence of clutter of the type that is intermittent and only occurs a small percentage of the time in any area of space being interrogated.

It is another object of this invention to provide an automatic clutter mapping system that reliably detects clutter in each of a plurality of quantum areas being mapped.

It is another object of this invention to provide a clutter detection system which allows clutter to be identified not only when it is of a stationary type but when it occurs only a very small percentage of the time.

It is a still further object of this invention to provide an automatic clutter mapping system that automatically rejects a substantially large percentage of fading clutter while reliably distinguishing the clutter from moving targets.

BRIEF DESCRIPTION OF THE DRAWING

These and other objects, features and advantages of the invention as well as the invention itself will become more apparent to those skilled in the art in the light of the following detailed description taken in consideration with the accompanying drawings wherein like reference numerals indicate like or corresponding parts throughout the several views wherein.

DESCRIPTION OF THE PREFERRED EMBODIMENT

Figure 1:
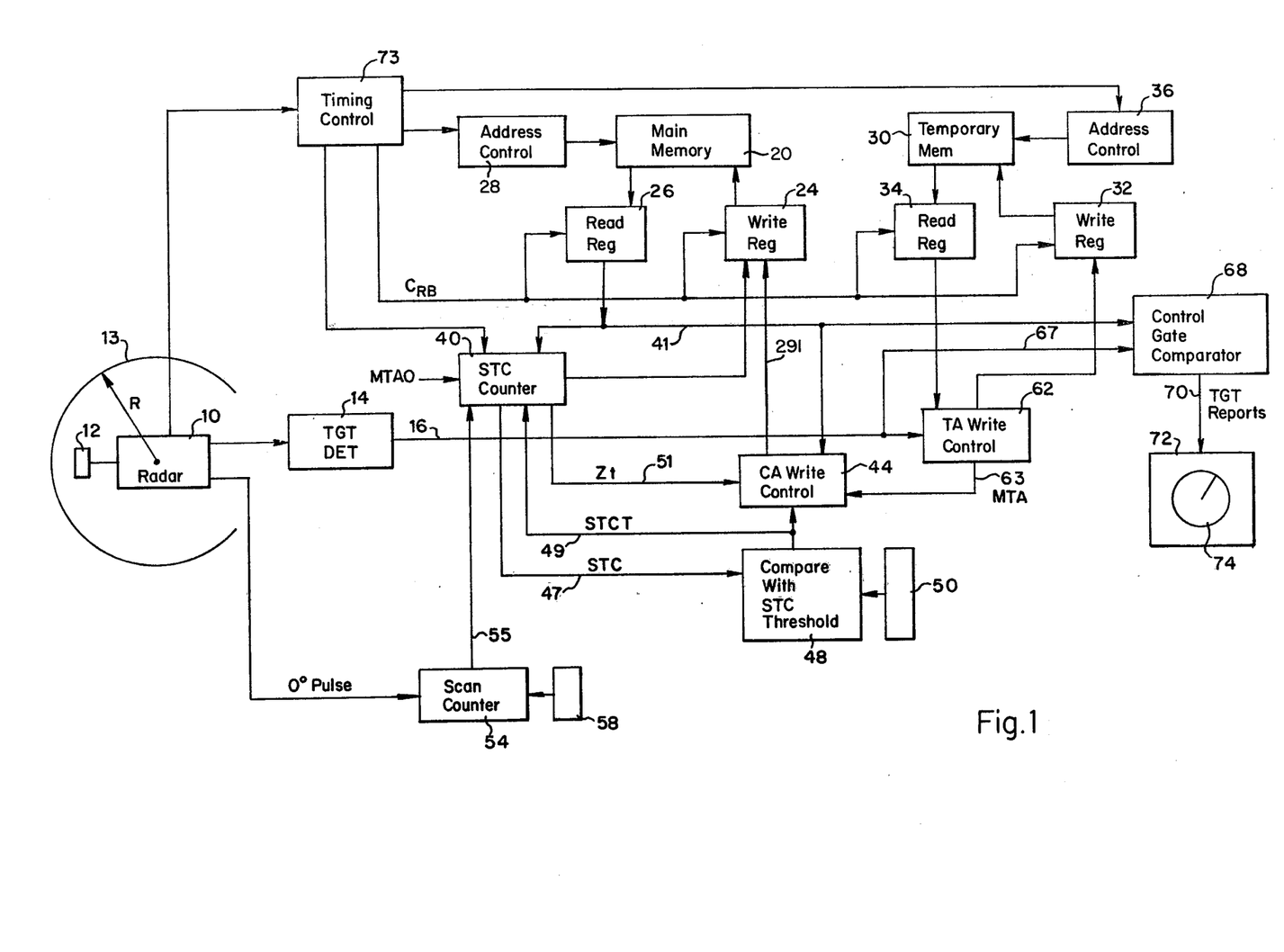
FIG. 1 is a schematic block diagram of the infinite ratio clutter mapper system in accordance with the principles of the invention.

Referring first to FIG. 1 which shows a block diagram of the clutter detecting system in accordance with the invention, the operation includes a radar system 10 which for 360° surveillance includes a rotating antenna 12 that rotates a complete revolution for each scan for mapping an area indicated by a circle 13. In response to energy transmitted into space through the antenna 12, reflected signals are intercepted and after passing through a suitable receiver are applied to a target detector 14 which may include suitable threshold arrangements for passing targets of a selected amplitude to an output lead 16, as is well known in the art. The system includes a main memory 20 which may be of any suitable type of memory such as a magnetic storage memory or a dynamic type memory utilizing integrated circuits, for example. The main memory 20 is coupled to a write register 24 and to a read register 26 and is addressed by an address control circuit 28 for accessing any desired storage cell therein. The system also includes a temporary memory 30 which may be of any suitable type such as a magnetic storage memory or a dynamic memory utilizing integrated circuits and coupled to a write register 32, a read register 34 and an address control unit 36. The temporary memory 30 is utilized to store the maximum target amplitude received on the lead 16 for each of the plurality of area clutter mapper cells. The main memory 20 is utilized principally to store the target or STC count code and the CA or reject code for each of the plurality of ACM mapper cells, which data is utilized to detect the presence of clutter. An STC or clutter counter unit 40 is coupled to the write register 24 and to the read register 26 as well as to the CA or reject code write control unit 44 and a compare circuit 48, the clutter counter 40 principally controlling the clutter count stored in the main memory 20. The compare unit 48 is coupled to the STC counter 40 by a lead 47 as well as to the CA write control unit 44 for determining a signal STCT representing the value of the reject code to be written into the ACM cells of the main memory 20 and which is applied on a lead 49 to the STC counter 40. A last range bin timing pulse $Z_T$ is applied from the STC counter 40 on a lead 51 to the CA write control unit 44 for writing the maximum target amplitude into the memory 20 at the last range bin time of each quantum area. A threshold setting unit 50 which may be manual is coupled to the compare unit 48 for selecting an STC threshold which, because the scan period is utilized in accordance with the invention to reset the counter bits under certain conditions a scan counter 54 is provided responsive to a zero degree pulse on a lead 56 from the radar system 10 to apply a scan count on a lead 55 to the STC counter 40 as well as to the compare unit 48. A manual unit 58 is provided for manual or automatic control of the scan threshold utilized in the scan counter 54.

A target amplitude or TA write control unit 62 is coupled to the lead 16 as well as to the write register 32 and the read register 34 for maintaining the largest amplitude for any target received in any area clutter mapping cell in the temporary member 30, that memory storing all of the area clutter mapping cells over the distance in one range sweep. The write control unit 62 supplies a maximum target amplitude signal MTA on a composite lead 63 to the reject code write control unit 44. A control gate 68 is coupled to the lead 16 as well as to the lead 41 for receiving the reject code and passing only targets in the absence of clutter to the output lead 70. The target reports of the lead 70 are then applied to suitable processing units 72 and to a clutter mapping display 74. A timing control unit 73 provides system timing in response to pulses from the radar 10, to the STC counter 40, the address control units 28 and 36 and the registers 24, 26, 32 and 34. Range bin clock pulses $C_{RB}$ are applied from the timing control unit 73 to the read and write registers.

Figure 2:
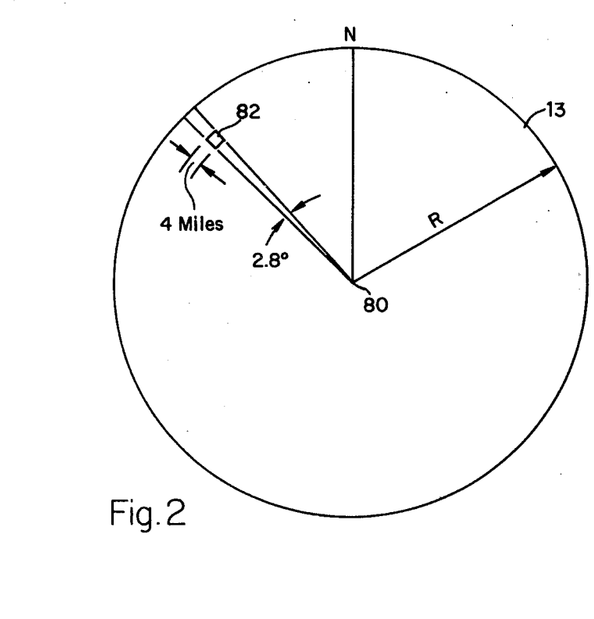
FIG. 2 is a schematic diagram showing the area in space being mapped for explaining the operation of the area clutter mapping cells of the plurality of quantum areas.

Referring now to FIG. 2 which shows the clutter map area in the circle 13 in accordance with the invention from a point 80 which is the location of the surveillance radar system, the entire area is divided up into quantum areas or area clutter mapper (ACM) cells such as 82 each having a dimension of 2.8125° in azimuth and four miles in range as an illustrated size for purposes of explanation. In the illustrated system each scan starts from a north pulse or north position, scanning 360° with a range distance from 0 to 256 miles so that there are 64 area clutter mapping cells such as 82 in the range dimension. In the azimuth dimension for the 2.8125° intervals there are 128 area clutter mapping cells.

Figures 3, 8:
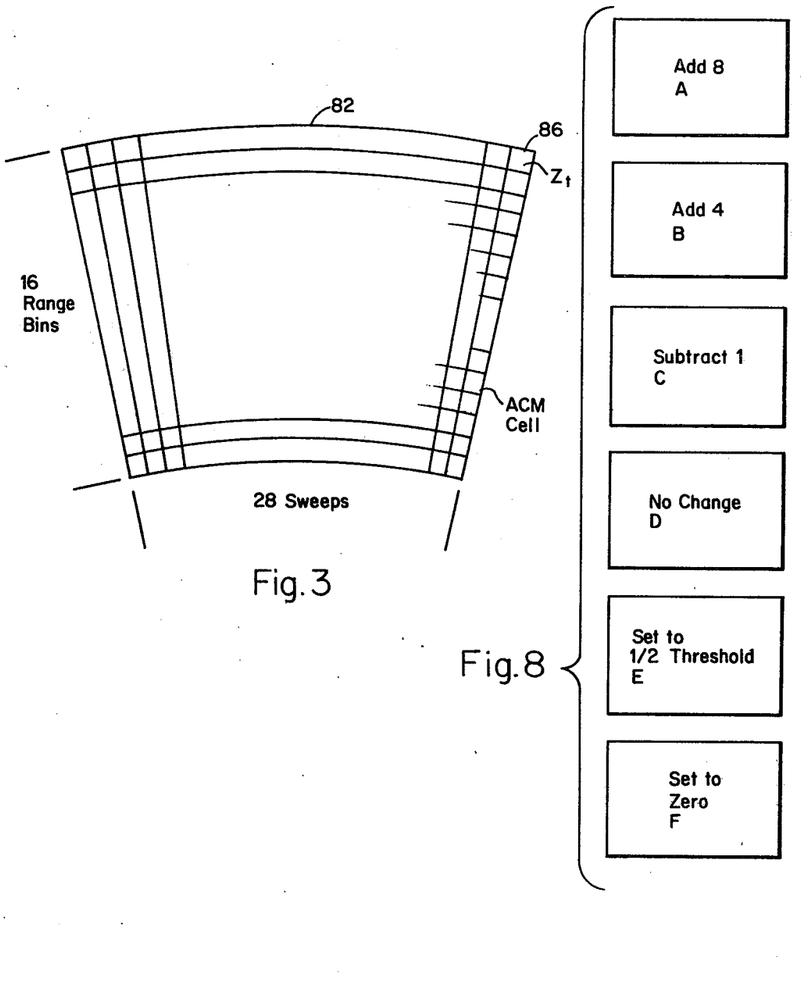
FIG. 3 is a schematic diagram of a clutter mapping quantum area for explaining the area division into range sweeps and range bins.
FIG. 8 is a schematic block diagram further explaining the target counter of FIG. 6.

Referring now to FIG. 3 which shows a typical ACM cell 82 it includes 16 range bins in the range dimension and 28 radar sweeps in the azimuth dimension. In the illustrated system a range bin represents a quarter mile and in the azimuth dimension each sweep covers an angle equal to 2.8125° divided by 28 or approximately one-tenth of a degree. In the last sweep passing through any ACM cell, the timing signal $Z_T$ is developed in a last range bin 86 for presetting the stored contents in the temporary memory for that cell and for other timing control throughout the system.

Figure 4:
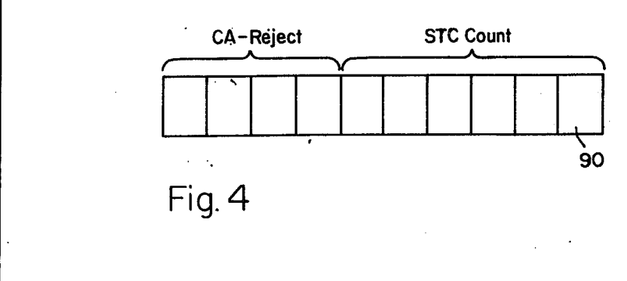
FIG. 4 is a schematic diagram of a typical area cell code word stored in the main memory for controlling the operation of the system of the invention.

Referring now to FIG. 4 a word 90 shows the storage of the CA or reject code in the first four bits in the storage cell of the memory with the STC count stored in the last six bits, this word 90 representing the clutter information stored in the main memory 20 for each ACM cell of the entire surveillance area 13 as shown in FIG. 2. It is to be noted that a single word such as 90 represents the clutter condition in the entire clutter mapping area such as 82 although targets are possibly detected in a number of range bins and in a number of sweeps.

Figure 5:
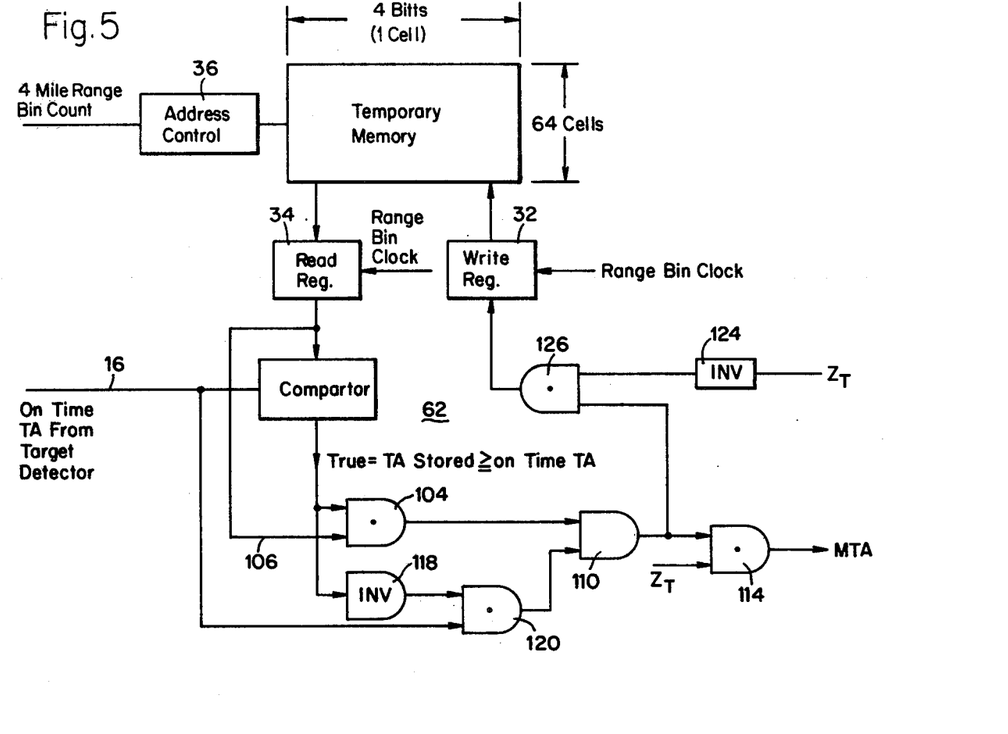
FIG. 5 is a schematic circuit and block diagram of the temporary memory and control logic utilized in the system of FIG. 1.

Referring now to FIG. 5 which shows the temporary memory 30 and the target amplitude write control unit 62 for determining the maximum target amplitude signal MTA. The address control 36 responds to a pulse representative of the four mile range bin count for continually addressing the storage cell representative of an ACM cell during the period of 16 range bins of each radar sweep. The temporary memory 30 has a range dimension for storing the maximum target amplitude signals in 64 cells and has an azimuth dimension of one cell, the total storage being four bits in each ACM cell. The on time target amplitude signal TA on the lead 16 is applied to a comparator 100 which for every range bin in each sweep receives the stored target amplitude from the temporary memory 30 that represents the entire cell. The read register and the write register each respond to a range bin clock so that reading and writing of the target amplitude signal for the entire ACM cell occurs for each range bin. When the comparison in the comparator 100 is true the stored target amplitude is greater than or equal to the on time target amplitude, a signal is applied through a lead 102 to an AND gate 104 and in coincidence with a stored target of any amplitude applied from the read register 34 through a lead 106, a signal is applied through an OR gate 110 to a lead 112 and in turn through an AND gate 114 also receiving a $Z_T$ timing signal, to apply a maximum target amplitude or MTA signal to an output lead 116. When a comparison is not true on the lead 102, a signal is applied through an inverter 118 to an AND gate 120 so that an on time target signal TA on the lead 16 causes a signal to be applied through the OR gate 110 and to the AND gate 114 as the maximum amplitude target representing the detection of a larger target in a range bin of the mapping cell. The operation occurs for 28 sweeps by sequentially interrogating in each sweep all 64 ACM cells and at the time of reading the stored word from the range bin of the last sweep for each ACM cell the $Z_T$ signal is true and is applied through an inverter 124 to an AND gate 126 which writes zeros into that cell of the memory 30 through the write register 32 so as to clear the temporary memory for the next scan position. Prior to this $Z_T$ time range bin, the AND gate 126 responds to the signal on the composite lead 112 to write the maximum target amplitude into the temporary memory 30 for each range bin.

Figure 6:
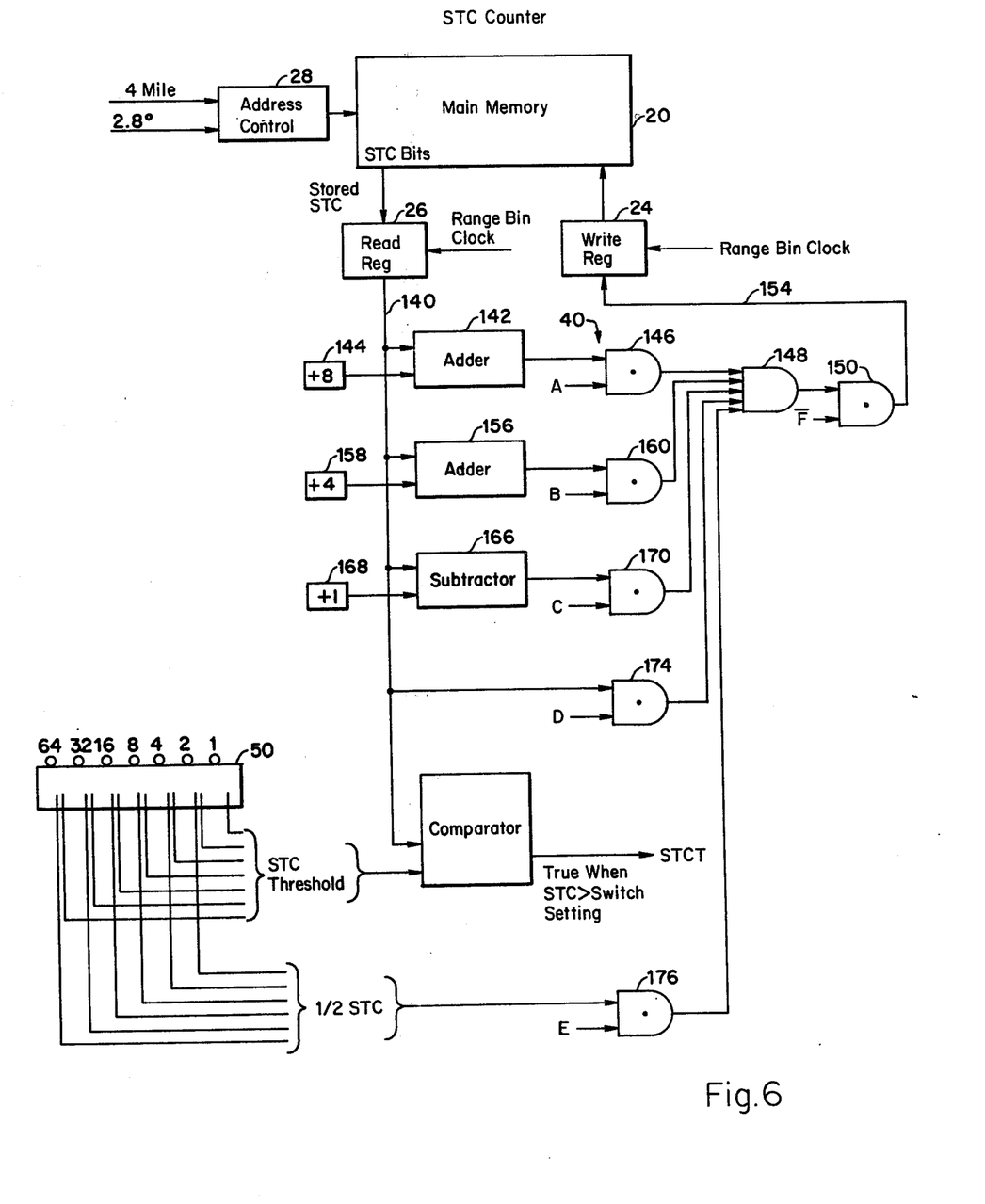
FIG. 6 is a schematic block and logical diagram for explaining the STC or target counter as well as the target compare circuit in the system of FIG. 1.

Referring now to FIG. 6 the STC or target counter unit 40 will be explained relative to the operation of the main memory 20. The write register 24 and the read register 26 both operate in response to a range bit bin clock to read and write during each range bin of each sweep of each of the ACM cells. The address control unit 28 responds to a four mile signal and a 2.8125° azimuth signal for addressing a single cell in the main memory 20 representative of the stored reject code and the STC count for that ACM cell. The STC count read from the main memory 20 during each range bin is applied to a lead 140 and for incrementing stored STC count during the first or clutter searching mode an adder 142 is coupled to the lead 140 for receiving the stored count and to a source 144 of the binary value of decimal +8 to apply the increased count to an AND gate 146 which in coincidence with an A term applies the count to an OR gate 148 and in turn to an AND gate 150. In the presence of an $\overline{F}$ term applied to the AND gate 150 indicating that the count is not to be set to zero, the increased or other count is applied through a lead 154 to the write register 24 for being written into that ACM cell during that range bin period. During any range bin period for incrementing the stored count by four which occurs in mode 2 which is the searching for clutter amplitude change when the stored reject code is greater than zero, an adder 156 is coupled to the lead 140 and receives a +4 value from a source 158 to apply the increased count to an AND gate 160 which in coincidence with a B term applies the increased count to the OR gate 148 for being rewritten into the memory 20. For decrementing by one the stored count during any range bin which occurs in mode 2 for a stored reject code greater than zero and a target amplitude less than that of the reject code, a subtractor 166 is coupled to the lead 140 and to a +1 value source 168 to apply a decremented count to an AND gate 170 which in coincidence with a C term applies the decrementative count to the OR gate 148 for being written into the main memory 20. For mode 1 operation with the absence of a target in the temporary memory or for mode 2 with the target amplitude equalling the amplitude of the reject code, an AND gate 174 is coupled to the lead 140 to provide no change to the stored target count in the presence of a D term and to apply the same value to the OR gate 148 to be written into the main memory 20. When it is desired to set the target count to one-half of the STC threshold an AND gate 176 receives a one-half STC threshold value from the threshold setting unit 50 and in coincidence with a term E writes this one-half threshold count into the main memory 20. For determining the STCT signal which is true when the stored STC count equals the STC threshold from the unit 50 a comparator 180 is coupled to the lead 140 and applies an STCT signal to an output lead 82. The comparator 180 may be formed from a Fairchild semiconductor comparator five bit 93L24 interconnected as recommended in the *TTL Applications Handbook of Fairchild Semiconductors* dated August 1973.

Figure 7:
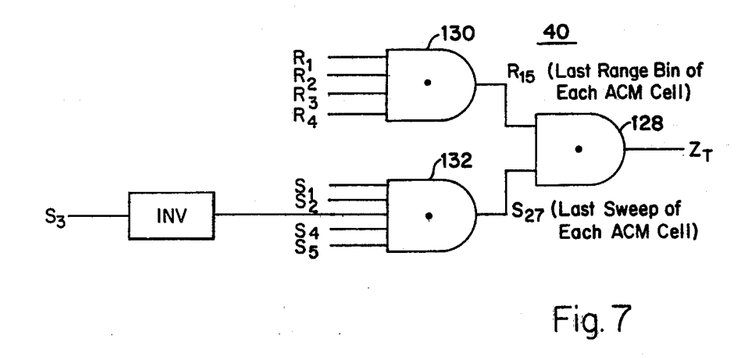
FIG. 7 is a schematic logical diagram for explaining a portion of the timing in the STC counter of FIG. 6.

Referring now to FIG. 7, the $Z_T$ timing signal is generated by an AND gate 128 receiving inputs from both an AND gate 130 and AND gate 132. The AND gate 130 receives inputs $R_1$, $R_2$, $R_3$ and $R_4$ which respectively represent the least to the most significant bits of the 16 range bin count for each sweep of each ACM cell. The AND gate 132 responds to $S_1$, $S_2$, $S_3$ after passing through an inverter 136, $S_4$ and $S_5$ with $S_1$ to $S_5$ respectively representing the least to the most significant bits of a sweep count representing the 28 sweeps of an ACM cell. The output of the AND gate 130 $R_{15}$ represents the last range bin of each ACM cell and the output of the AND gate 132 $S_{27}$ represents the last sweep of each ACM cell.

Referring now to FIG. 8, the STC counter terms A to F are shown in blocks to more clearly illustrate their control function. Each of the terms A through F may be provided by the following expressions.

| | | | | | |
|---|---|---|---|---|---|
| (+8) | $A = \overline{(SCT)}$ | (CAO) | $\overline{(MTAO)}$ | $(Z_T)$ | |
| (+4) | $B = \overline{(CAO)}$ | (MTG) | $(Z_T)$ | | |
| (−1) | $C = \overline{(CAO)}$ | (MTL) | $(Z_T)$ | | |
| (0) | $D = \overline{(CAO)}$ | (MTE) | $(Z_T) + \overline{(SCT)}$ | (CAO) (MTAO) $(Z_T)$ | |
| (Set STC | $E = (CAO)$ | $\overline{(MTAO)}$ | (STCT) | $Z_T$ [Clutter presence detected] | |
| to ½ of STC | $+ \overline{(CAO)}$ | (MTG) | (STCT) | $Z_T$ [Clutter amplitude decrease detected] | |
| threshold | $+ \overline{(CAO)}$ | (MTL) | (STCO) | $Z_T$ [Clutter amplitude decrease detected] | |
| (Resets to 0) | $F = (CAO)$ | (SCT) | $Z_T + \overline{(CAO)}$ | (MTAO) (STCO) $Z_T$ [Clutter faded] | |

Figure 9:
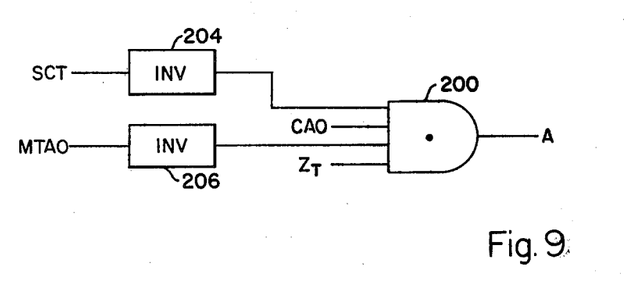
FIGS. 9–13 are schematic logical diagrams for further explaining the operation of the target counter of FIG. 6.

Referring now also to FIG. 9 the term A is generated by an AND gate 200 receiving a scan count threshold signal SCT after being inverted in an inverter unit 204, a signal CAO indicating the absence of a reject code, a signal MTAO after being inverted in an inverter 206 and a timing pulse $Z_T$ indicating the last range bin of the last sweep of an ACM cell.

Figure 10:
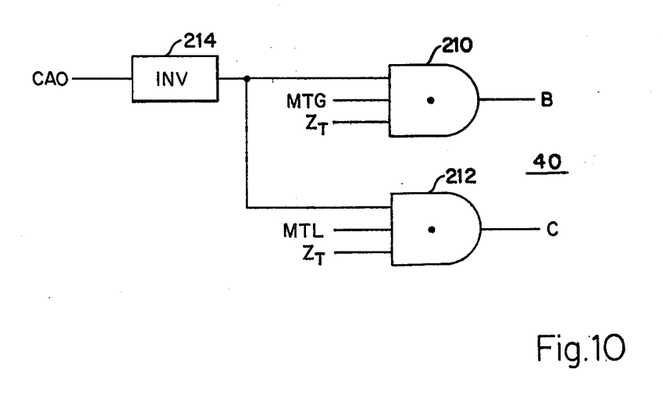

Referring now to FIG. 10 the B term is developed in an AND gate 210 and the C term is developed in an AND gate 212, the AND gate 210 receiving a CAO term after being applied through an inverter 214, an MTG term indicating that the target amplitude in that range bin is greater than the CA reject code and a $Z_T$ timing term. The gate 212 responds to develop the C term when the output of the inverter 214 is true, an MTL term is true indicating that the maximum target amplitude in that range bin is less than the reject code CA and the $Z_T$ term is true.

Figure 11:
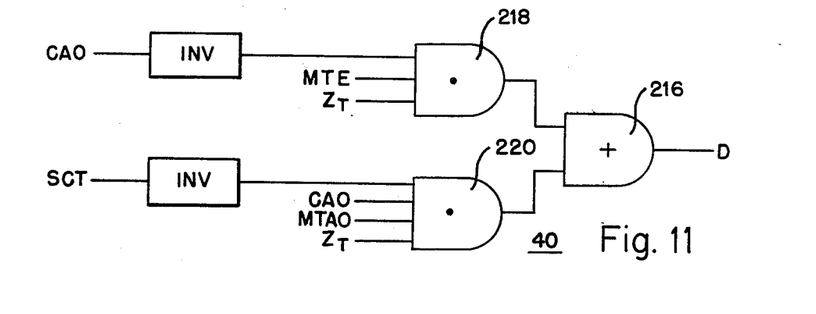

Referring now to FIG. 11, the D term is provided by an OR gate 216 responding to the output of either an AND gate 218 or an AND gate 220 with the AND gate 218 receiving the CAO term after passing through an inverter 222, an MTE term indicating that the maximum target amplitude in that range bin is equal to the reject CA code value and a $Z_T$ timing term. The AND gate 220 responds to a coincidence of an SCT term after being passed through an inverter 226, a CAO term indicating that the reject code is zero an MTAO term indicating that the maximum target amplitude is zero and a $Z_T$ timing term.

Figure 12:
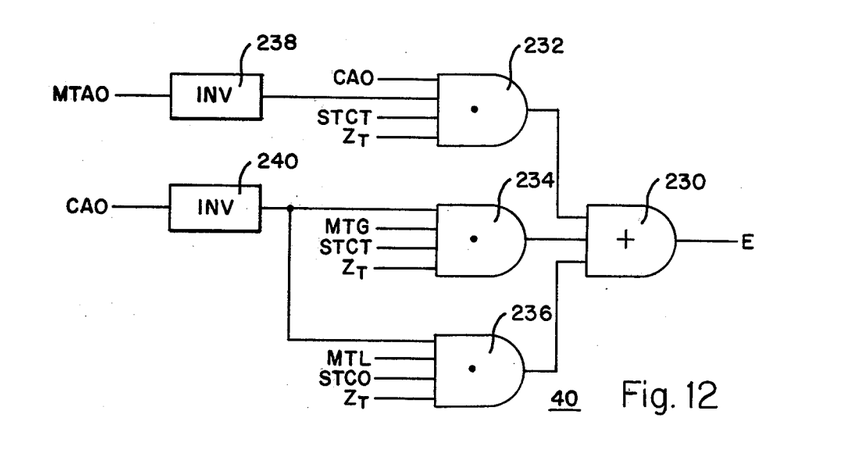

Referring now to FIG. 12 the E term is developed by an OR gate 230 responding to either the output from a AND gate 232, an AND gate 234 or an AND gate 236. The AND gate 232 receives a CAO term, an MTAO term after passing through an inverter 238, an STCT term indicating that the STC count has reached its threshold and a $Z_T$ timing term. The AND gate 234 responds to a CAO term after passing through an inverter 240, an MTG term indicating that the maximum target amplitude is greater than the amplitude of the reject CA code, an STCT and a $Z_T$ timing term. The AND gate 236 responds to CA term at the output of the inverter 240, an MTL term indicating that the maximum target amplitude is less than CA, an STCO term generated when the STC count is equal to zero and a $Z_T$ timing term.

Figure 13:
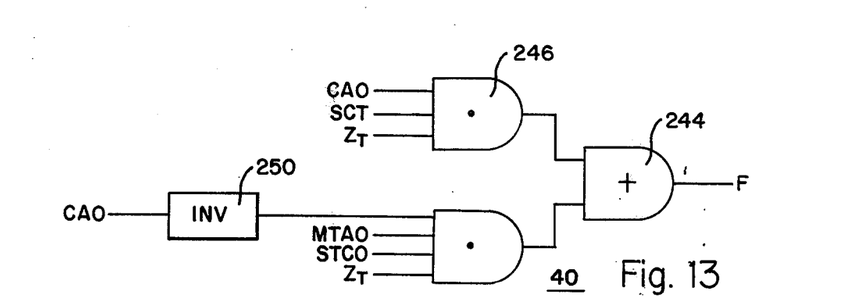

Referring now to FIG. 13 the F term is generated by an OR gate 244 receiving a signal from either an AND gate 246 or an AND gate 248 with the AND gate 246 receiving the term CAO, SCT and the timing term $Z_T$. The AND gate 248 receives a CAO term after passing through an inverter 250, an MTAO term indicating a target amplitude of zero, an STCO term when the STC count is zero and a $Z_T$ term for providing the last range bin timing.

Figure 14:
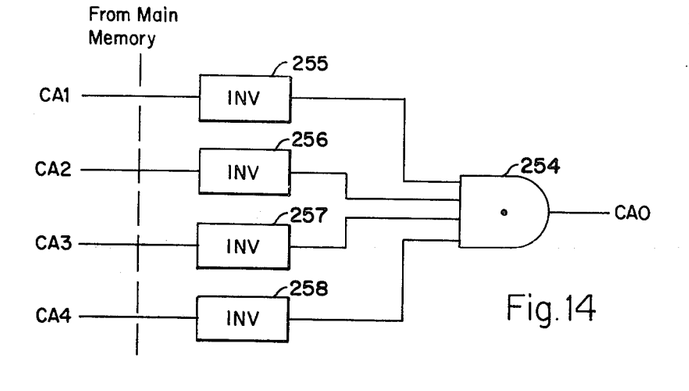
FIGS. 14–17 are logical diagrams for explaining generation of some of the terms utilized in the STC counter of FIG. 6.

Referring now to FIG. 14 the CAO term for the STC counter 40 indicating that the reject code is zero, is formed in an AND gate 254 receiving the stored CA bits CA1, CA2, CA3 and CA4 from the main memory after being applied through respective inverters 255 to 258.

Figure 15:
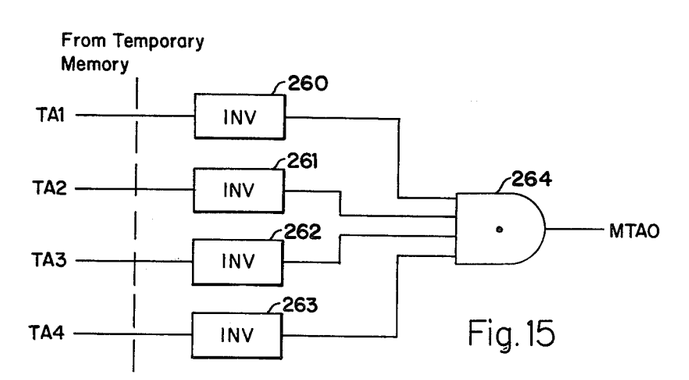

Referring now to FIG. 15 which develops the MTAO signal or the inverse of the maximum target amplitude which may be considered in the write control circuit 62, the TA bits from the temporary memory TA1, TA2, TA3 and TA4 are each supplied through inverters 260 to 263 to an AND gate 264 for developing the signal MTAO.

Figure 16:
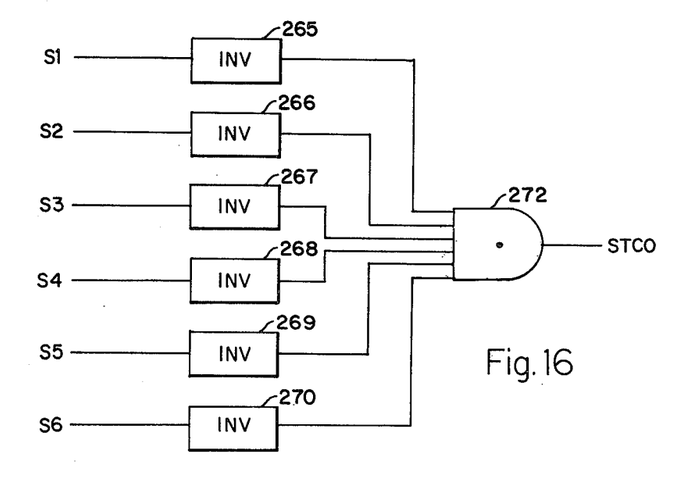

In FIG. 16 which may be considered a part of the STC counter 40, the count or STC bits S1, S2, S3, S4, S5 and S6 are applied through inverters 265 to 270 to an AND gate 272 for developing the signal STCO indicating that the STC count is equal to zero.

Figure 17:
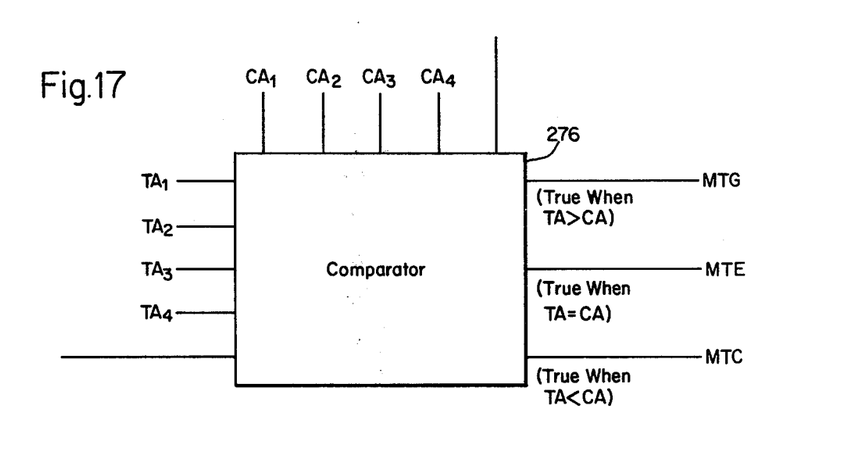

Referring now to FIG. 17 which is in the STC counter 40, a comparator 276 which may be a Fairchild conductor No. 9324 unit having two comparators properly connected, responds during each range bin period to the target amplitude signals TA1, TA2, TA3 and TA4 and to the reject code CA1, CA2, CA3 and CA4 to develop the signal MPG which is true when TA is greater than CA, the signal MTE which is true when TA equals CA and MTL which is true when TA is less than CA.

Figure 18:
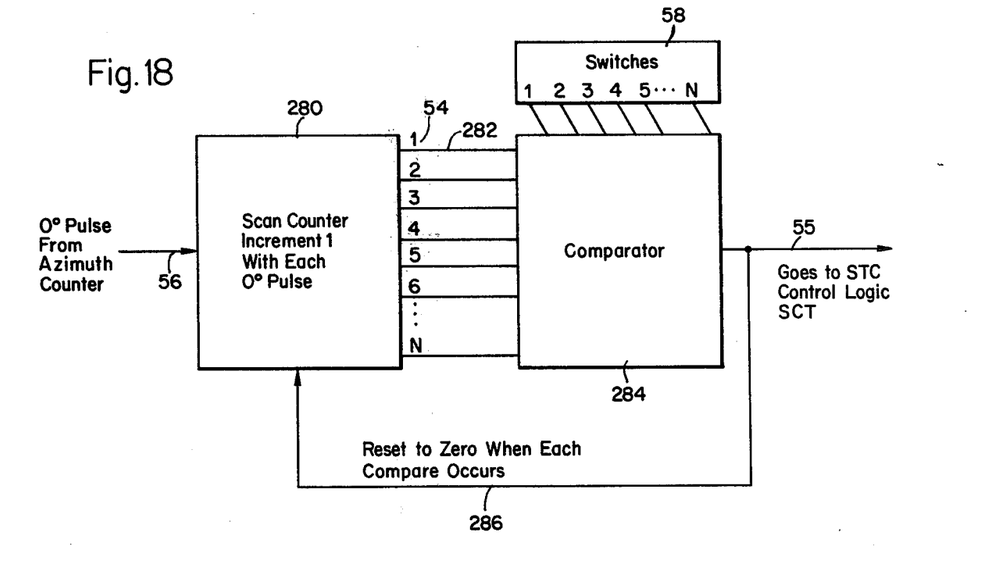
FIG. 18 is a schematic block diagram for explaining the comparator utilized in the STC counter of FIG. 6.

Referring now to FIG. 18, the scan counter 54 of FIG. 1 will be explained in further detail. The counter 280 is incremented by one with each 0° pulse received on the lead 56 for counting the radar scans and providing the output of the count on leads 282 which are applied to a comparator 284 having a source of threshold signals 58 which for example may be manual switches and set at 40 scans in the illustrated example to provide an SCT pulse on the lead 55 to the STC control logic in response to a comparison. The scan counter 280 is reset through a lead 286 upon the formation of the pulse SCT.

Figure 19:
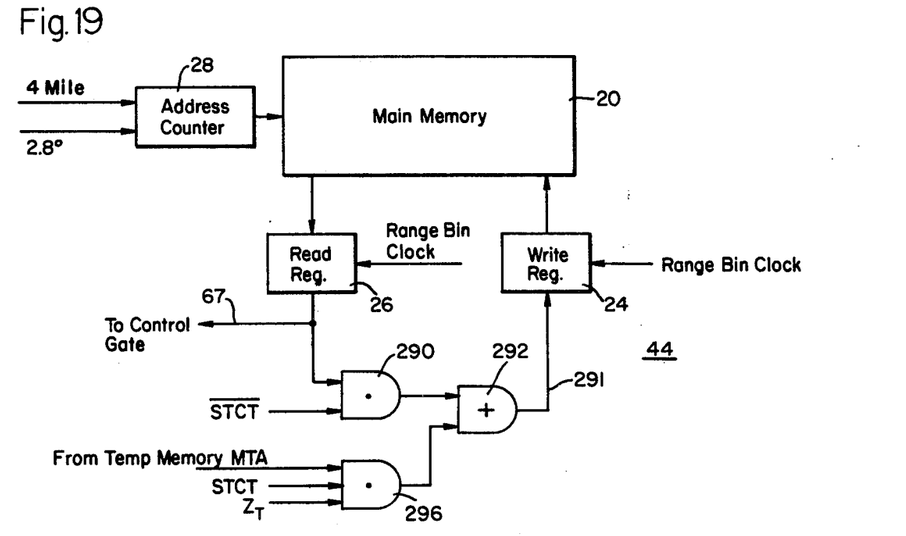
FIG. 19 is a schematic block diagram of the scan counter utilized in the system of FIG. 1.

Referring now to FIG. 19 the CA write control circuit 44 has an AND gate 290 responding during each range bin period to the CA code from the read register 26 and the signal STCT indicating the absence of target count having reached its threshold, to apply the reject code through an OR gate 292 through lead 291 to be written into the main memory 20 through the write register 24 during that range bin period. The CA signal supplied to the control gate 68 of FIG. 1 is applied thereto through the lead 67 for rejecting target signals in the presence of clutter. An AND gate 296 responds to the maximum target amplitude signal MTA, the signal STCT indicating the target count has reached its threshold and the timing signal $Z_T$ to write the maximum target amplitude into the main memory 20 from the temporary memory at time $Z_T$.

Figure 20:
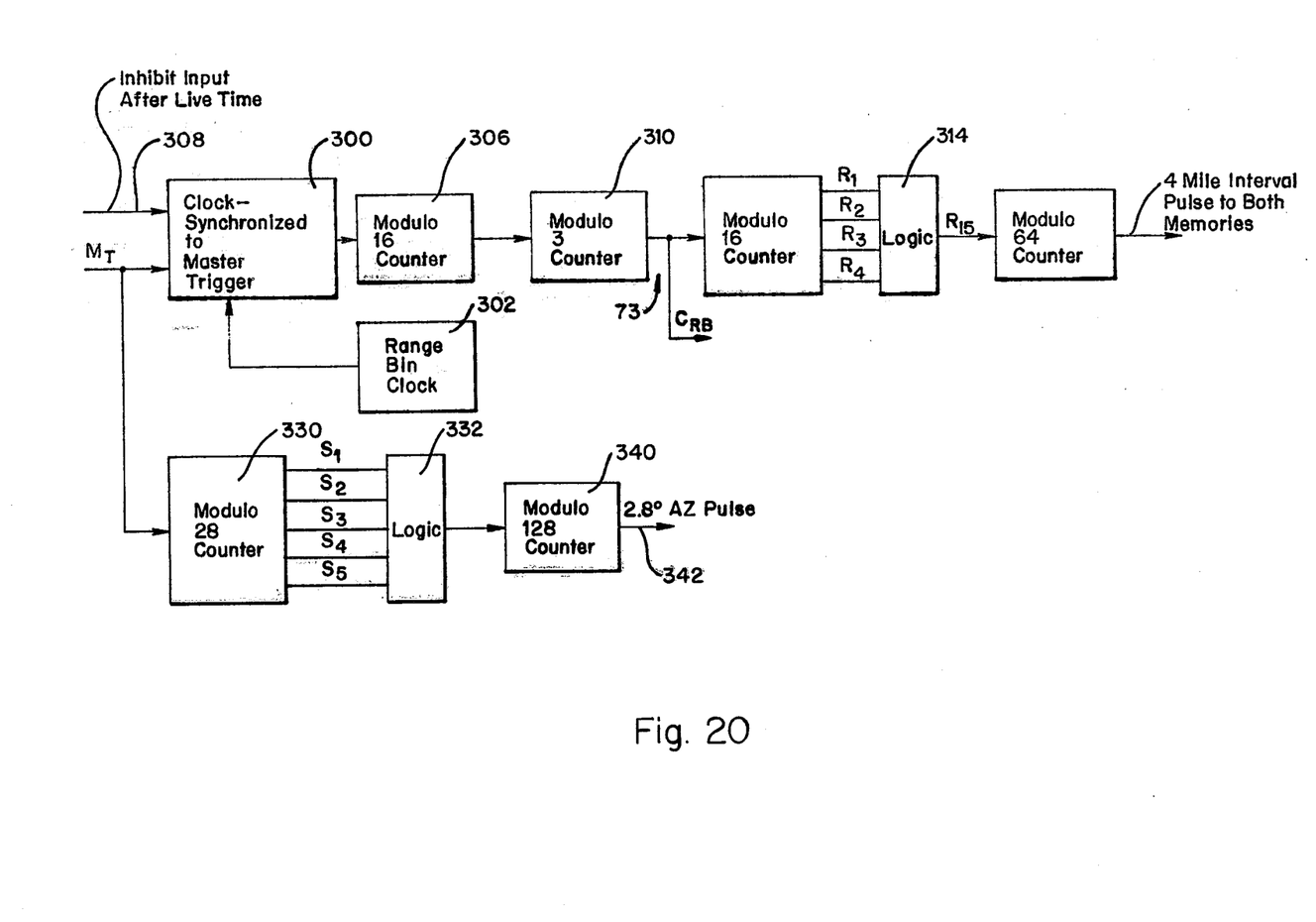
FIG. 20 is a schematic block and logical diagram for explaining the reject or CA write control in the system of FIG. 1.

Referring now to FIG. 20 the timing control unit 73 of FIG. 1 will be explained in further detail to show the timing of the temporary and main memories. The synchronizer clock 300 which responds to an $M_T$ or master trigger signal from the radar and receiving clock pulses from a range bin clock 302 which for example may operate at 16 MHZ applies clock pulses to a mode 16 counter 306. The synchronizer clock 300 also may receive an inhibit signal on a lead 308 which inhibits its operation after the radar lifetime as is well known in the art. The clock 306 develops a one microsecond clock pulse which is applied to a mode three counter 310 which in turn develops three microsecond clock pulses (one quarter mile) which are the $C_{RB}$ or range bin pulses. The $C_{RB}$ pulses are supplied to a mode 16 counter 312 for counting 16 range bins and developing four bits $R_1$, $R_2$, $R_3$ and $R_4$ which in turn are applied to a logic circuit 314 to generate the signal $R_{15}$. The signal $R_{15}$ is applied to a modulo 64 counter 318 which develops a pulse on a lead 320 which is a four mile interval pulse and is applied to both temporary and the main memory. The modulo 28 counter 330 also receives the $M_T$ or master trigger synchronizing signal to develop signals $S_1$, $S_2$, $S_3$, $S_4$ and $S_5$ which are applied to a suitable logic circuit 332 for generating the signal $S_{27}$ representing the maximum count for the automatic mapping clutter cells in the azimuth dimension for one sweep. The signal $S_{27}$ is applied from the logic circuit 332 to a modulo 128 counter 340 to develop a 2.8125° azimuth pulse on a lead 342 which is applied to the main memory 20 for providing addressing therein of each mapping cell.

Referring now principally to FIG. 1 the operation of the automatic clutter system will be explained in further detail. The following table shows the control of the clutter count and of the reject code CA in the memory 20 for both searching for the presence of clutter in mode 1 and for searching for clutter amplitude changes in mode 2.

| | MAIN MEMORY WRITE AT $Z_T$ TIME | |
|---|---|---|
| STC | Searching for Clutter Mode 1 | Searching for Clutter Amplitude Change |
| | For Stored CA = 0000 Increment by 8 for MTA in temp. mem. ≠ 0000 - Recirculate CA = 0000 | For Stored CA ≠ 0000 Increment by 4 for TA>CA. If STC, threshold is reached, write new MTA into CA. |
| | If increment of STC causes STC threshold to be exceeded, set STC to ½ threshold- write MTA into CA. | No change if TA = CA |
| STC | No increment if MTA in temp. mem. = 40000. If scan count = max. (44), reset STC to 0 - Recirculate CA = 0000. | Decrement by 1 if TA<CA. At STC = 0, write new TA into CA. If new TA = 0000, (clutter gone) revert to Mode 1. |

In the first mode when CA equals 0000 the A logic increments the STC word by eight for the largest target amplitude in the temporary memory and recirculates the reject code CA equal to 0000. When the word STC is incremented to cause it to reach the STC threshold the STC word is then set to onehalf threshold by the E logic and the MTA is written into the maim memory at that quantum area cell for the CA reject code. If there are no detections of a target for an area cell, the MTA in the temporary memory is equal to 0000 and the STC word is not incremented. If the scan count equals its maximum value of 44, the STC word is reset to zero. Also for this condition the CA reject code 0000 is recirculated.

For a stored reject code CA which is not equal to 0000 indicating the system is searching for clutter amplitude change, the STC word is incremented by four as a result of the B logic when the target amplitude is greater than CA. When the STC threshold for any area cell is reached, a new MTA is written into main memory as the CA reject code. The STC count is not changed if the target amplitude equals the value of the CA reject code. The STC count is decremented by one in the mode 2 if target amplitude is less than CA which is performed by the C logic as previously described.

The following example shows the operation of the system for a scan count of 44 showing the value of the target amplitude TA, target count STC and the reject code CA.

EXAMPLE E

| SCAN COUNTER & SCAN NUMBER | | TA | STC | CA |
|---|---|---|---|---|
| | 1 | 0000 | $0_{(10)}$ | 0000 |
| | 2 | 0011 | $8_{(10)}$ | 0000 |
| Mode 1 | 3 | 0011 | $16_{(10)}$ | 0000 |
| | 4 | 0011 | $24_{(10)}$ | 0000 |
| | 5 | 0011 | $32_{(10)}$ | 0000 |
| Clutter Detected | 6 | 0011 | $40_{10} \to 20_{(10)}$ | 0000→0011 |
| | 7 | 0011 | $20_{(10)}$ | 0011 |
| | 8 | 0011 | $20_{(10)}$ | 0011 |
| | 9 | 0011 | $20_{(10)}$ | 0011 |
| | 10 | 0101 | $24_{(10)}$ | 0011 |
| | 11 | 0101 | $28_{(10)}$ | 0011 |
| | 12 | 0101 | $32_{(10)}$ | 0011 |
| | 13 | 0101 | $36_{(10)}$ | 0011 |
| Clutter TA Increase Detected | 14 | 0101 | $40_{(10)} \to 20_{(0)}$ | 0011→0101 |
| | 15 | 0101 | $20_{(10)}$ | 0101 |
| | 16 | 0101 | $20_{(10)}$ | 0101 |
| Mode II | 17 | 0001 | $16_{(10)}$ | 0101 |
| | 18 | 0001 | $12_{(10)}$ | 0101 |
| | 19 | 0001 | $8_{(10)}$ | 0101 |
| | 20 | 0001 | $4_{(10)}$ | 0101 |
| Clutter TA Decrease Detected | 21 | 0001 | $0_{(10)} \to 20_{(10)}$ | 0101→0001 |
| | 22 | 0001 | $20_{(10)}$ | 0001 |
| | 23 | 0001 | $20_{(10)}$ | 0001 |
| | 24 | 0001 | $20_{(10)}$ | 0001 |
| MODE II | 25 | 0000 | $16_{(10)}$ | 0001 |
| | 26 | 0000 | $12_{(10)}$ | 0001 |
| | 27 | 0000 | $8_{(10)}$ | 0001 |
| | 28 | 0000 | $4_{(10)}$ | 0001 |
| Clutter Fade Detected | 29 | 0000 | 0→0 | 0001→0000 |
| | 30 | 0000 | 0 | 0000 |
| | 31 | 0000 | 0 | 0000 |
| | 32 | 0000 | 0 | 0000 |
| Valid Target Present | 33 | 1111 | $8_{(10)}$ | 0000 |
| | 34 | 1111 | $16_{(10)}$ | 0000 |
| | 35 | 1111 | $24_{(10)}$ | 0000 |
| | 36 | 0000 | $24_{(10)}$ | 0000 |
| | 37 | 0000 | $24_{(10)}$ | 0000 |
| | 38 | 0000 | $24_{(10)}$ | 0000 |
| MODE I | 39 | 0000 | $24_{(10)}$ | 0000 |

EXAMPLE E-continued

| SCAN COUNTER & SCAN NUMBER | | TA | STC | CA |
|---|---|---|---|---|
| | 40 | 0000 | $24_{(10)}$ | 0000 |
| | 41 | 0000 | $24_{(10)}$ | 0000 |
| | 42 | 0000 | $24_{(10)}$ | 0000 |
| | 43 | 0000 | $24_{(10)}$ | 0000 |
| Scan Counter Threshold Reached | 44 | 0000 | $24_{(10)} \rightarrow 0_{(10)}$ | 0000 |

In this example the STC threshold is 40 and the midrange STC threshold setting is 20 with the example being for a single ACM cell in the clutter mapper memory 20. During scans one to five which is operation in mode 1 input target signals TA are detected while CA remains 0000 until scan 6 at which time the STC count reaches the STC threshold of 40 and is reset to 20 with the maximum target amplitude being written into the main memory as the CA code of 0011. The operation which during scan 6 goes into the second mode or clutter amplitude detection mode continues to scan 14 at which time the STC count again reaches the threshold is set to half of its threshold value and a new reject code 0101 is written into the main memory for that clutter mapper cell. The STC count is again increased by 8 as a result of target signals being received until at scan 21 the STC threshold is again reached the STC count being reset to half of threshold and a new CA reject code of lesser amplitude being written into the main memory. At this point in time, the clutter signals decrease or the clutter received by the radar is starting to fade and at scan 29 the STC count has been decremented by one until it reaches zero and the reject code CA is set to 0000 so that the operation goes back into mode 1 for clutter searching. During scans 33, 34 and 35 valid targets are present but the STC count only increases to decimal 24 and the system remains in the mode 1 operation for that clutter mapper cell. At scan 44 the scan counter threshold is reached and the STC count is reset to zero and the CA reject code of 0000 is recirculated. It is to be noted that the scan counter threshold resets the STC count only in mode 1. The operation continues for that ACM cell from this point with a new scan count of one.

Figure 21:
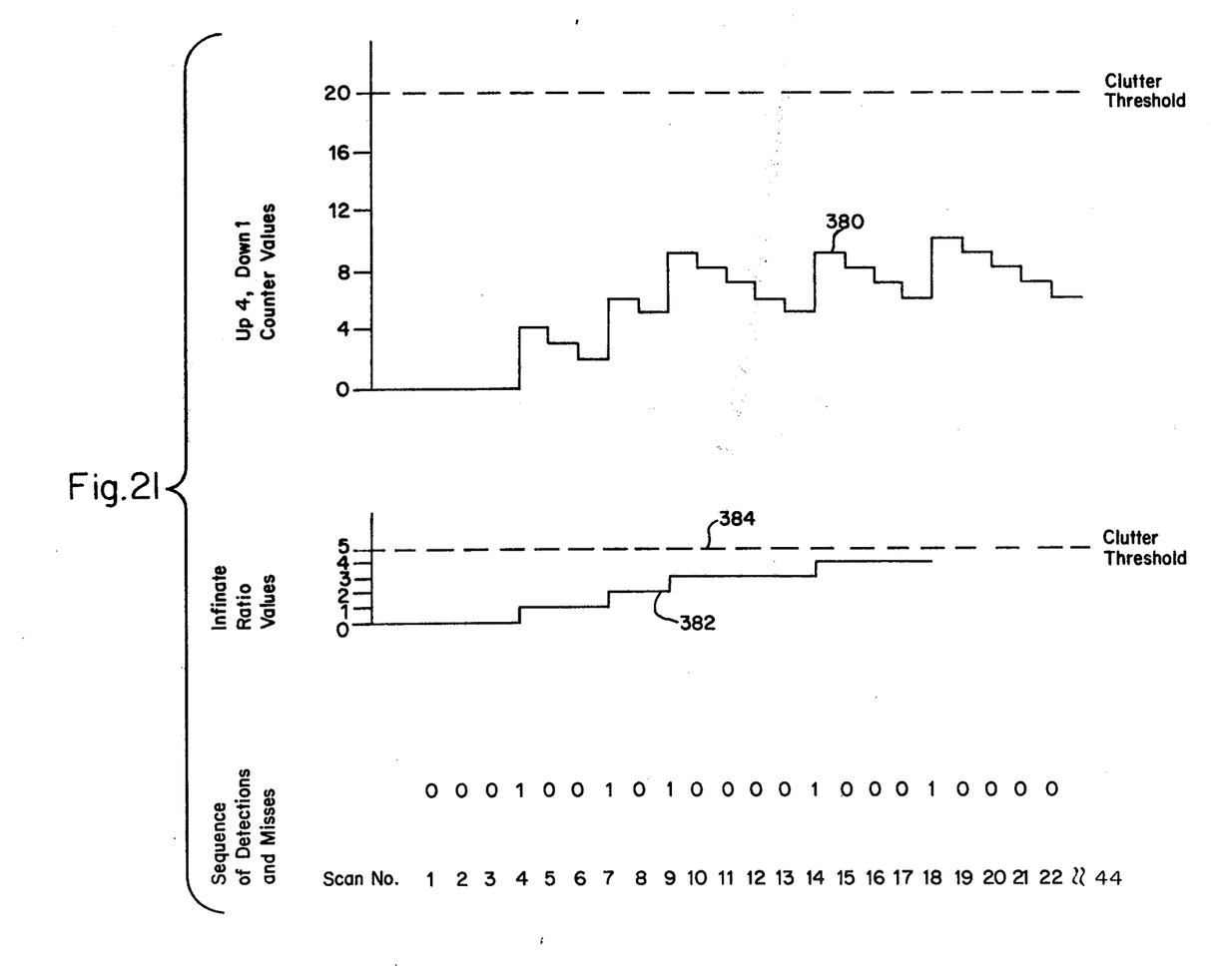
FIG. 21 is a schematic diagram of count values versus scan number for illustrating the response of the system of the invention to intermittent clutter as compared to a conventional clutter detection system.

Referring to FIG. 21, a curve 380 shows the operation of a conventional threshold detector arrangement for a single quantum area which counts up by four and down by one in response to target detection during a plurality of scans in an area clutter mapping cell. For intermittent clutter which occurs a small percentage of the time the curve 380 shows that the clutter threshold is not reached so that a target is not rejected for that quantum area. In the system of the invention for the same reception of targets, a curve 382 shows that at scan 18 the clutter threshold 318 is reached and the system goes into operation for mode 2. At a scan number 44 the STC count is not reset but be it noted that if the threshold had not been reached the STC count would be reset to zero. In the example the clutter threshold 384 is set at 5 allowing valid moving targets to fly across the cell in less than five scans.

Figure 22:
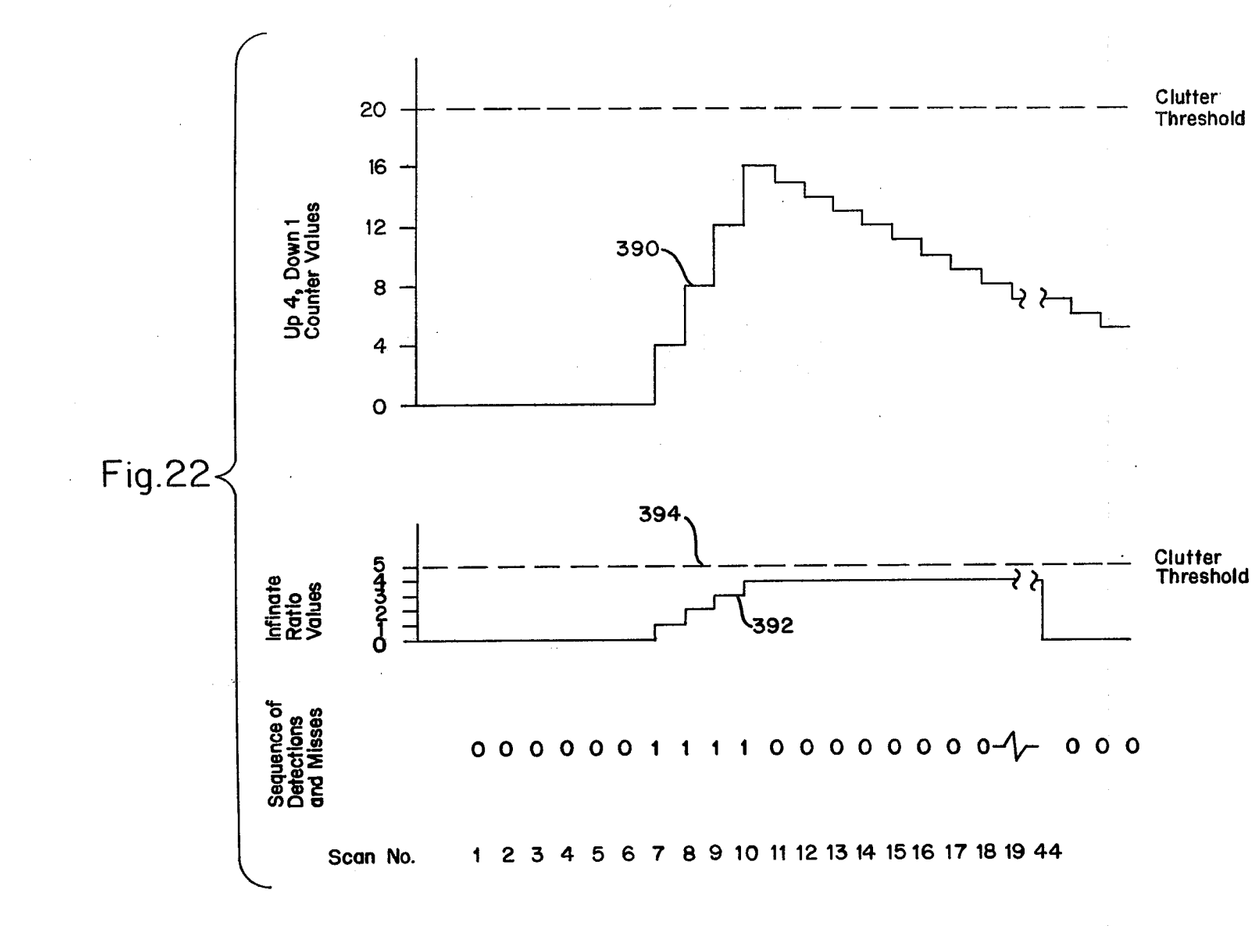
FIG. 22 is a schematic diagram of target counts as a function of scan number for illustrating the response of the system of the invention to valid moving targets as compared to conventional clutter detection systems.

Referring now to FIG. 22 which is an example of response to valid moving targets flying across the cell a curve 390 shows that the clutter threshold is not reached in the example of a conventional up four and down one threshold counter. Also a curve 392 shows that in the system of the invention, a clutter threshold 394 is not reached for valid moving targets. The curve 392 also shows that in mode 1 the STC count is reset to 0 when the scan count reaches its maximum of 44. Although the system of the invention is not limited to any particular threshold level the threshold of 40 which represents five scans in the illustrated example allows valid moving targets to pass through a quantum area without being detected as clutter.

Thus there has been described an improved clutter mapper system that provides an infinite ratio determination of clutter by incrementing the clutter count by eight for targets greater than zero and by not decrementing when there is no detection. When the clutter count bits reach the threshold a CA reject code is written to indicate the presence of clutter in a mapping cell, the CA code being the amplitude of the maximum target report in that cell. At this time the clutter count is set to midrange and if the threshold has not been again reached at the end of a scan period the clutter count bits are reset to zero. When clutter is present in a second mode of operation, the system automatically searches for changes in the amplitude of clutter by incrementing the STC count by four for detection and is decrementing the STC count by one for detections when the target amplitude is less than the stored reject code. Also in the second mode when the clutter count reaches the selected threshold, the reject bits are reset again to the new maximum target amplitude whether it is greater or less than the previous value. In the second mode if the clutter count reaches zero the reject code is again set to zero if the clutter is gone and the system returns to the clutter searching mode. Thus the system by continually resetting the reject code upon the clutter count reaching the threshold to either a greater or to a lesser value reliably responds to intermittent and to fading clutter so that targets may be rejected in a cell having a clutter condition indicated by the reject code. The system not only allows detection of clutter with a substantially constant clutter false alarm rate but responds to the occurrence of valid moving targets without erroneous determinations. The principles of the invention are not only applicable to surveillance radar systems but also to other types of radar systems, laser systems or any system providing received data from an area of terrain or space.

What is claimed is:

1. A target detection system operating with a surveillance radar providing target signals, said target detection system detecting the presence of clutter in each of a plurality of quantum areas in the surveillance area comprising
    a main memory for storing a clutter count and a reject code for each quantum area,
    clutter counter means coupled to said main memory and responsive to said target signals for incrementing the clutter count for the presence of target signals from a quantum area and inhibiting any change of the clutter count in the absence of a target signal from said quantum area, said clutter counter including means for providing said reject code when the clutter count reaches a threshold,
    scan counting means, and
    reset means coupled to said scan counting means and to said clutter counter means for resetting said clutter count if said count does not reach the threshold in a selected number of scans.

2. The combination of claim 1 further including a control gate coupled to said memory and to said radar for passing said target signals for each quantum area in the absence of a reject code and for rejecting said target signal in the presence of a reject code.

3. The combination of claim 2 further including a temporary memory and target write control means coupled to said radar and to said temporary memory for writing the maximum target amplitude in said temporary memory for each quantum area, said means for providing said reject code being coupled to said target write control means for storing the maximum target amplitude in said main memory as the reject code in response to said clutter counter means.

4. The combination of claim 3 in which said reset means includes means to reset said clutter count to a predetermined portion of the threshold count when a reject code is written into the main memory.

5. The combination of claim 4 in which said clutter counter means includes means responsive for each quantum area to said reject code stored in said main memory to increment said clutter counter by a selected value in response to a target signal and to decrement said clutter count a selected value in the absence of a target signal and to change said reject code to a value indicating the absence of clutter when said target count reaches zero.

6. The combination of claim 5 in which said clutter counter means includes means to write a new maximum target amplitude as the reject code amplitude in said main memory when said clutter count reaches said threshold during the presence of a reject code.

7. A video mapping system for operation with a surveillance radar system adapted to cover a surveillance area including a plurality of quantum areas of equiangular radial segments being divided radially into an equal number of quantum sections representative of equal increments of range, said radar system developing quantized video target signals, comprising a main memory for storing a clutter count and a reject code for each quantum area, a temporary memory for storing a maximum target amplitude for a selected number of quantum areas, target control means coupled to said temporary memory for storing the maximum target amplitude therein for any quantum area, target counter means coupled to said main memory and to said radar system for incrementing the target count in response to each of said target signals and rewriting the previous target count in the absence of a target signal, said target counter means providing a target threshold signal when the target count is equal to a selected threshold, reject code control means coupled to said main memory, to said target control means and to said target counter means for writing the maximum target amplitude into said main memory as the reject code in response to said target threshold signal, and control means coupled to said main memory and to said radar system for inhibiting the passing of target signals in the presence of the reject code for each quantum area.

8. The combination of claim 7 in which said target counter means includes means to set the target count to a selected proportion of the threshold for any quantum area when a reject code is written into the main memory.

9. The combination of claim 8 further including a scan counter coupled to said radar system and a means in said target counter means for responding to each quantum area in the presence of a reject code in said main memory to increment the target count a selected amount and decrement said target count a selected amount in the respective presence and absence of a target signal.

10. The combination of claim 9 including means in said reject code control means to write a new target amplitude in said main memory as said reject code, when the target count is greater than said threshold and when a reject code has been previously determined for the corresponding quantum area.

11. The combination of claim 10 in which said reject code control means includes means to reset said reject code to zero when the target count reaches zero.

12. A video mapping system for an energy receiving system in which an area being interrogated is divided into quantum areas comprising:

memory means for storing a clutter count and a reject code for each quantum area, count forming means coupled to said memory means and to said energy receiving system for storing a clutter count for each quantum area, incrementing the stored count in response to a clutter signal and rewriting the stored count in the absence of a clutter signal, reject code control means coupled to said memory means and to said count forming means for writing a reject code in said memory means when said clutter count reaches a selected threshold, means in said count forming means to both increment and decrement the clutter count in response to the respective presence or absence of a clutter signal from a quantum area having a stored reject code, and means in said reject code control means to set the reject code to zero when the clutter count reaches zero for any quantum area having a reject code greater than zero stored in said memory means.

13. The combination of claim 12 in which said memory means includes temporary memory means to determine said clutter signals as the maximum amplitude clutter signal for each quantum area.

* * * * *